United States Patent
Liang et al.

(10) Patent No.: US 6,359,800 B1
(45) Date of Patent: Mar. 19, 2002

(54) DIRECT CURRENT ELECTRIC POWER GENERATION SYSTEM WITH VARIABLE SPEED ALTERNATING CURRENT GENERATORS

(75) Inventors: Feng Liang, Canton; John Michael Miller, Saline; Xingyi Xu, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/546,764

(22) Filed: Apr. 11, 2000

(51) Int. Cl.[7] ................................................. H02M 7/00
(52) U.S. Cl. ........................ 363/70; 363/125; 363/145
(58) Field of Search ............................... 363/67, 69, 70, 363/145, 84, 125; 322/28, 29

(56) References Cited

U.S. PATENT DOCUMENTS

| | | |
|---|---|---|
| 3,694,731 A | 9/1972 | Cherry |
| 3,984,750 A | 10/1976 | Pfeffer et al. |
| 4,456,870 A | 6/1984 | Rodari |
| 4,667,282 A | 5/1987 | Peterson |
| 5,214,371 A | 5/1993 | Naidu |
| 5,510,696 A | 4/1996 | Naidu et al. |
| 5,642,021 A | 6/1997 | Liang et al. |
| 6,239,582 B1 * | 5/2001 | Buzan et al. .................. 322/20 |

FOREIGN PATENT DOCUMENTS

RU    SU 0970565    * 10/1982    .................. 363/145

* cited by examiner

Primary Examiner—Peter S. Wong
Assistant Examiner—Gary L. Laxton
(74) Attorney, Agent, or Firm—Mark S. Sparschu

(57) ABSTRACT

A method and system for increasing the output of an alternator for an automotive vehicle has a first three-phase winding (18) and a second three-phase winding (20) that are coupled to a respective first rectifier circuit (26) and a second rectifier circuit (28). A switch circuit (30) is located between the first rectifier circuit (26) and the second rectifier circuit (28). A controller (32) that is coupled to a speed sensor (34) and provides a signal indicative of the speed of the alternator, controls the operation of the switch circuit (30). When the speed sensor (34) indicates that the speed of the alternator is below a predetermined threshold, the first rectifier circuit (26) and second rectifier circuit (28) are coupled together through switch circuit (30). When the speed sensor (34) indicates that the speed of the alternator is above a predetermined speed, the switch circuit (32) is controlled to an open state so that two parallel half-wave rectifier circuits are formed.

18 Claims, 2 Drawing Sheets

DIRECT CURRENT ELECTRIC POWER GENERATION SYSTEM WITH VARIABLE SPEED ALTERNATING CURRENT GENERATORS

TECHNICAL FIELD

The present invention relates generally to alternators, and more specifically to a rectifier reconfiguration scheme for an alternator.

BACKGROUND

Alternators are used in automotive vehicles to generate electricity that may be used to power the electrical components of the vehicle and to charge the vehicle battery. The alternator is typically utilized to provide a direct current (DC) output. A conventional motor vehicle alternator includes a three-phase stator winding with a rotor magnetically coupled to the stator. The rotor is driven by the vehicle's internal combustion engine. As the rotor is driven, three-phase current generated at the output connections of the stator windings is rectified by a three-phase diode rectifier. The output current and efficiency of the alternator vary with the speed of the engine which is controlled in accordance with the operational requirements of the vehicle.

One key operation parameter is the ratio between the phase voltage and the number of turns of the phase windings. Unfortunately, the optimum voltage to turn ratio that yields maximum output is not constant. The optimum voltage to turn ratio increases proportionally as the generator speed increases. Therefore, if the voltage to turn ratio of the generator can be increased as the generator speed increases, the generator output and efficiency will be increased at high generator speeds.

One method to increase the voltage to turns ratio is to reduce the number of turns while keeping the voltage the same. One such system is disclosed in commonly assigned U.S. Pat. No. 5,642,021 to the present inventors. Another possible approach is to change the rectifier configuration from a full-wave rectifier to a half-wave rectifier at high speed. By changing the rectifier configuration from full-wave to half-wave, the phase voltage can be increased as a result. The voltage to turn ratio is thus closer to an optimum value when the alternator is at high speed. However, the alternator may lose balanced operation after the rectifier is changed from full-wave to a half-wave configuration because the half-wave rectifier only allows one phase winding to conduct at any moment of time. Unbalanced operation leads to alternator vibration and higher noise level.

It is particularly important in the operation of a hybrid electric vehicle to provide a system having high power density (output per unit volume) and efficiency.

SUMMARY OF THE INVENTION

One object of the present invention is to provide an alternator system having a high power density and efficiency.

In one aspect of the invention, a rectifier circuit or an alternator has a switch circuit having a first side and a second side. The rectifier circuit has a first half-wave diode rectifier coupled to the first side and a second half-wave diode rectifier coupled to the second side. A first three-phase stator winding is coupled to the first half-wave diode rectifier and a second three-phase stator winding is coupled to the second half-wave diode rectifier. A controller is coupled to the switch circuit for controlling the switch circuit from an open state to a closed state so that the rectifier configuration can be changed.

In a further aspect of the invention, a method for controlling an alternator having a first three-phase winding coupled to a first half-wave rectifier and a second three-phase winding coupled to a second half-wave diode rectifier comprises the steps of:

generating a speed signal corresponding to the rotational speed of the alternator;

coupling the first half-wave rectifier and the second half-wave rectifier together when the speed of the alternator is below a threshold to form a full-wave rectifier; and forming two parallel half-wave rectifiers when the speed signal is above a predetermined threshold.

One advantage of the invention is that when providing two parallel half-wave rectifiers, the operation of the alternator is balanced. By providing balanced operation of the alternator, alternator vibration and thus the noise associated therewith is reduced. Another advantage of the invention is that the efficiency of the alternator is increased at high speeds.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
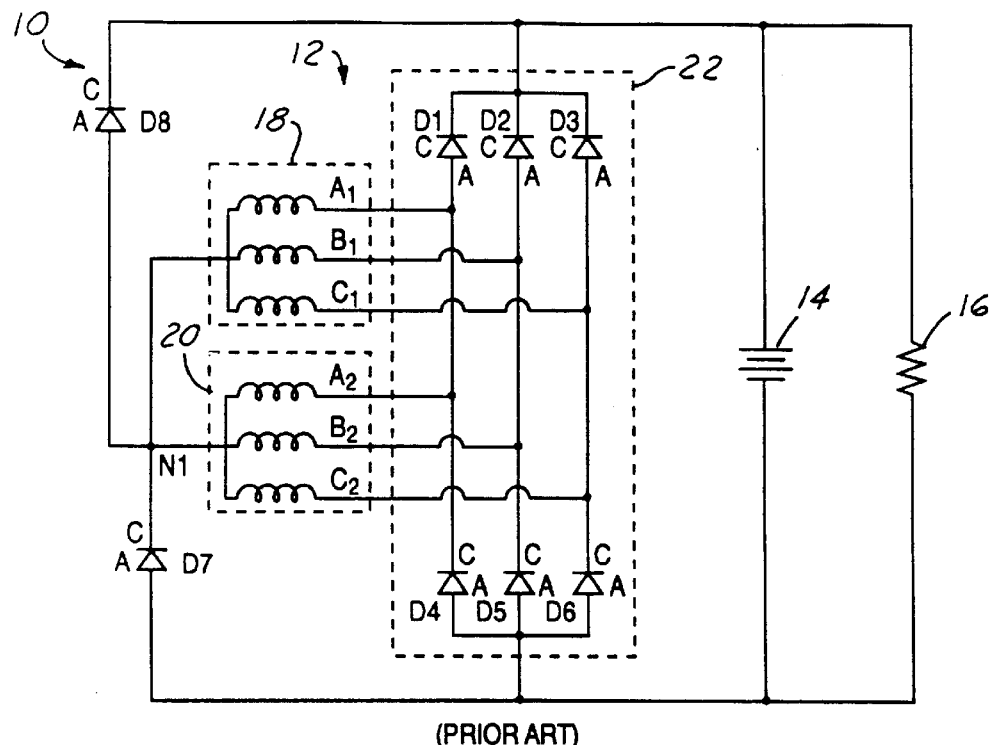
FIG. 1 is a circuit diagram of an alternator of the prior art.

In the following figures, the same reference numerals will be used to identify identical components in the various views.

Referring now to FIG. 1, a prior art schematic of a DC electric power generation system 10 having an alternator 12 and a rectifier circuit 22 is illustrated. Alternator 12 is coupled to a battery 14 and a load 16 (through rectifier 22). Battery 14 is charged by alternator 12. The alternator is mechanically driven by an internal combustion engine to generate a direct current (DC) output to charge battery 14 of a motor vehicle and operate electrical equipment of the motor vehicle. Alternator 12 has a first three-phase winding 18 and a second three-phase winding 20 coupled to a full-wave rectifier 22. Because the alternator generates three-phase alternating current, it is necessary to rectify the alternating current to provide a DC output.

The first three-phase winding has three windings, A1, B1 and C1. The second three-phase winding 20 has windings A2, B2 and C2. The full-wave rectifier circuit 22 has diodes D1, D2, D3, D4, D5, and D6. Each diode has a cathode, each labeled C, and an anode, each labeled A. Full-wave rectifier 22 provides full-wave rectification to battery 14 and load 16.

The first three-phase winding 18 and the second three-phase winding 20 are coupled to the diodes D1 through D6 as follows. The output terminals of windings W1 and W4 are coupled to a common node having the anode of diode D1 and the cathode of D4. The output terminals of windings W2 and W5 are connected to a common node having the anode of diode D2 and the cathode of D5. The output terminals of windings W3 and W6 are coupled to a common node having the anode of diode D3 and the cathode of diode D6. The other terminals of windings W1 through W6 are coupled to a common node N1. A diode D8 has an anode coupled to node N1 and a cathode coupled to the cathodes of diodes D1, D2, and D3. A diode D7 has a cathode coupled to node 1 and an anode coupled to the anode of diodes D4, D5, and D6.

The drawback to this system is that voltage to turn ratio is fixed. Therefore, the ratio is far away from the optimum ratio at high speed. As a result, the output power and efficiency of the alternator can be increased at high speed by increasing the phase voltage at high speed.

Figure 2:
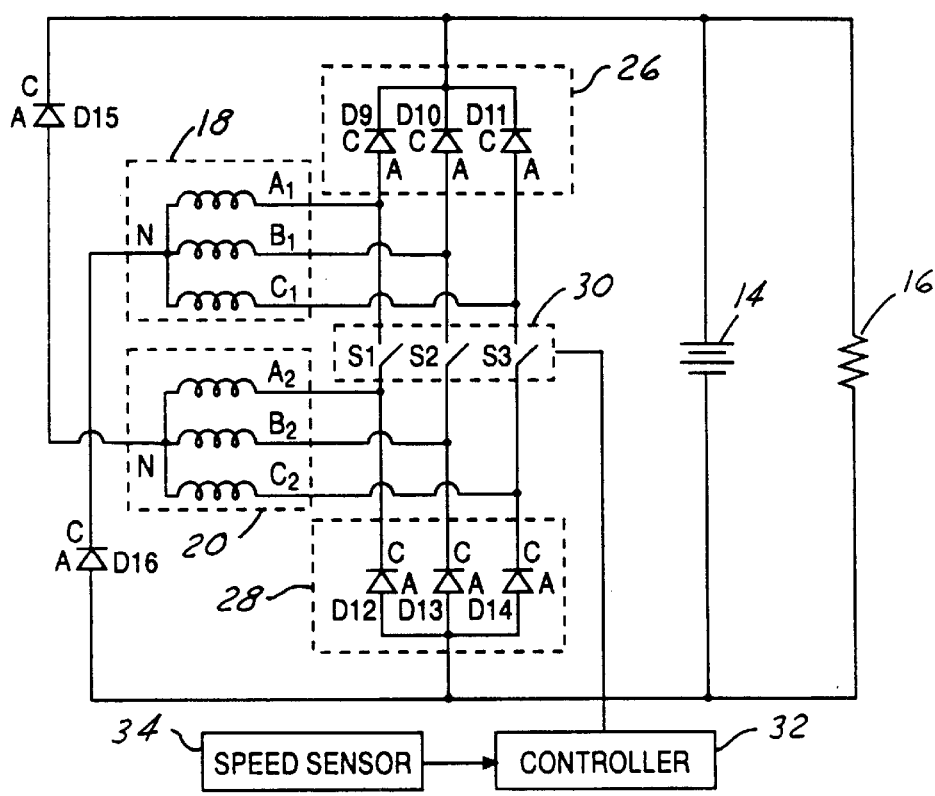
FIG. 2 is a circuit diagram of an alternator circuit according to the present invention.

Referring now to FIG. 2, the DC electric power generation system 10 has rectifier circuits 26 and 28 that are coupled to battery 14 and load 16 as above. The first three-phase winding 18 and second three-phase winding 20 are the same as that shown in FIG. 1.

The first rectifier circuit 26 has diodes D9, D10, and D11. Second rectifier circuit 28 has diodes D12, D13, and D14. Each of the diodes is labeled with anodes A and cathodes C as above. A switch circuit 30 having a plurality of switches S1, S2, and S3 is coupled between first rectifier circuit 26 and second rectifier circuit 28. Switches S1, S2, and S3 are preferably semiconductor switches.

A controller 32 is coupled to switches S1, S2, and S3 to control the operation of the switches between an open position and a closed position. Controller 32 may be microprocessor controlled. Controller 32 is coupled to a speed sensor 34 that provides a speed signal corresponding to the speed of rotation of the alternator rotor.

The rectification circuit 24 is configured as follows: the output terminals of windings A1, B1, and C1 are coupled to the anodes respectively of diodes D9, D10, and D11 of first rectifier circuit 26. The output terminals of windings A2, B2, and C2 are coupled to a respective cathode of diodes D12, D13, and D14 of second rectifier circuit 28. The other three terminals of the second three-phase winding 20 are coupled to the anode of a diode D15. The cathode of diode D15 is coupled to the cathodes of diodes D9, D10, and D11. The other three terminals of the first three-phase winding 18 are coupled to a cathode of a diode D16. The anode of diode D16 is coupled to the anode of diodes D12, D13, and D14. The diodes 15 and 16 are similar to that shown in FIG. 1 except for diodes D15 and diodes D16 do not share a common node. This is important for the operation of the circuit as will be further described below.

In operation, the circuit configuration changes by the operation of the switch circuit 30. The switches S1, S2, and S3 of switch circuit 30 are in a closed state. This first state corresponds to when the speed sensor 34 indicates the speed of the rotor of the alternator is below a predetermined speed. In a second state, the switches S1, S2, and S3 of switch circuit 30 are in an open state. The second state or open state preferably occurs when speed sensor 34 provides a speed signal that is greater than a predetermined threshold. For example, the predetermined threshold may be about 2,500 rpms. Of course, those skilled in the art would recognize that this predetermined threshold will vary depending on the characteristics of the circuit and the alternator to which the present invention is applied.

In the first state the alternator is configured with switches S1, S2, and S3 closed. First rectifier circuit 26 and second rectifier circuit 28 combined to form a full-wave rectifier circuit. In this state the output of both the first rectifier circuit 26 and the second rectifier circuit 28 are coupled together. That is, windings A1 and A2 are coupled to a common node including anode A of diode D9 and cathode C of diode D12; and winding B1 and winding B2 are coupled to a common node including the anode A of diode D10 and the cathode C of diode D13; and, winding C1 and winding C2 are coupled to a common node including anode A of diode D11 and cathode C of diode D14. Thus, full-wave rectification is provided by the combination of rectification circuit 26 and second rectification circuit 28.

In the second mode of operation, when controller 32 senses speed 34 is above a predetermined threshold, switches S1, S2, and S3 of switch circuit 30 are opened. Thus, diodes D9, D10, D11, and D16 form a half-wave rectification circuit. Also, diodes D12, D13, D14, and D15 form a half-wave rectification circuit. Both half-wave rectification circuits are in parallel. The polarities of the windings of first three-phase winding 18 and of the windings of the second three-phase winding 20 have the same polarities. Thus, when winding A1 is conducting, winding A2 is not conducting and vice versa. The same is true for windings B1 and B2, C1 and C2. This provides a balanced operation to the alternator and thus reduces the noise of the alternator. The phase voltage in half-wave mode is higher than in full-wave mode and thus switching to half-wave mode at high speed will increase the voltage to turn ratio which will significantly increase the output of the alternator. This type of system is highly suitable for hybrid type vehicles for electric power generation since the power generation system output increases as the speed increases.

Figure 3:
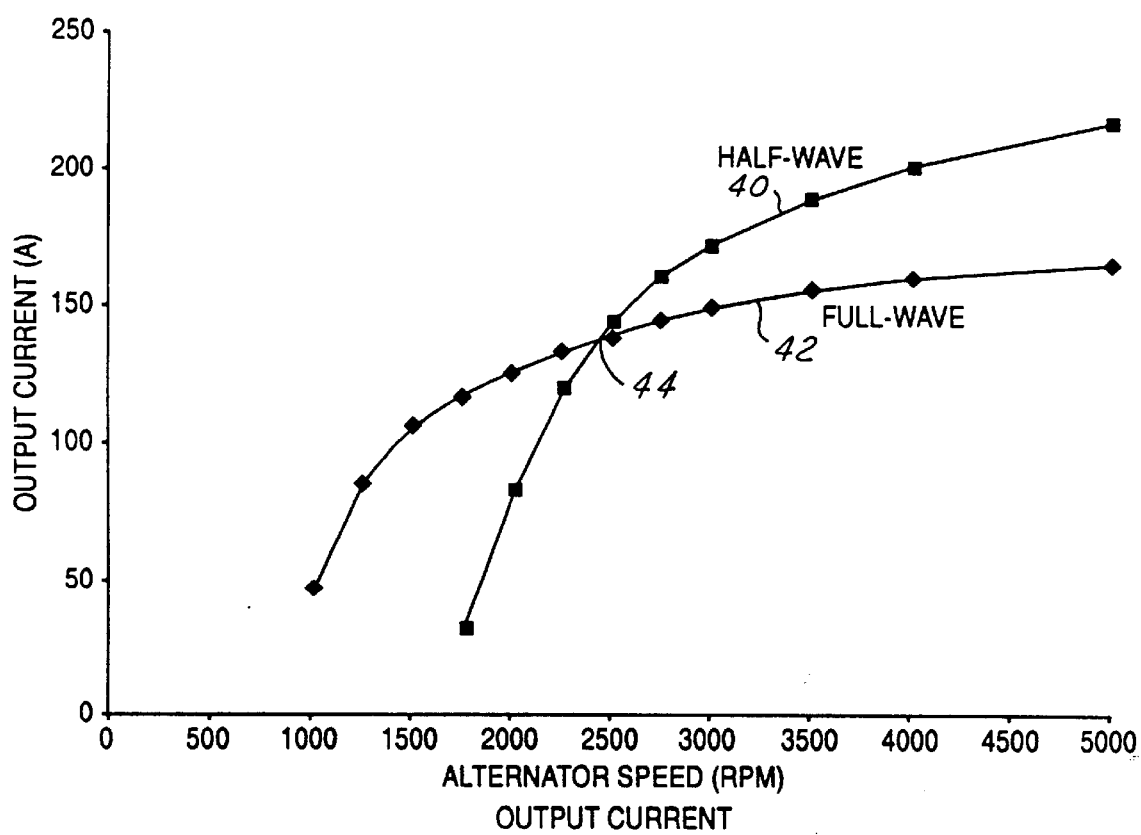
FIG. 3 is a graph illustrating output current versus alternator speed of the alternator circuit of FIG. 2 operating in half-wave and full-wave modes.

Referring now to FIG. 3, a plot illustrating the operation of the alternator in half-wave mode 40 is shown contrasted to the operation in full-wave mode 42. When the output current of half-wave mode increases greater than that of full-wave mode, it is desirable to switch over to half-wave mode. As shown, this is about at point 44 which corresponds to a speed of 2,500 rpms. Thus, above the predetermined point 44 half-wave mode is desirable to increase the power output of the alternator.

While particular embodiments of the invention have been shown and described, numerous variations alternate embodiments will occur to those skilled in the art. Accordingly, it is intended that the invention be limited only in terms of the appended claims.

What is claimed is:

1. A rectifier circuit for an alternator comprising:
    a switch circuit having a first side and second side;
    a first diode rectifier coupled to the first side;
    a first three-phase stator winding coupled to the first diode rectifier;
    a second diode rectifier coupled to the second side of said switch circuit;
    a second three-phase winding coupled to the second diode rectifier; and
    a controller coupled to said switch circuit for controlling said switch circuit from an open state to a closed state so that the rectifier configuration is changed.

2. A rectifier circuit as recited in claim 1 further comprising a speed sensor coupled to said controller that generates a speed signal corresponding to alternator speed.

3. A rectifier circuit as recited in claim 2 wherein said switch circuit comprises a plurality of switches each of said switches coupled to one of a plurality of diodes in said first diode rectifier and one of a plurality of diodes in said second rectifier.

4. A rectifier circuit as recited in claim 3 wherein said controller simultaneously controls said switches when said speed signal reaches a predetermined speed.

5. A rectifier circuit as recited in claim 4 wherein said controller opens said switches above said predetermined speed.

6. A rectifier circuit as recited in claim 1 wherein when said switch circuit is in an open state forming a half-wave rectifier circuit comprising said first three-phase winding and said first diode rectifier.

7. A rectifier circuit as recited in claim 6 wherein when said switch is in an open state a second half-wave rectifier circuit is formed comprising said second winding and said second diode rectifier.

8. A rectifier circuit as recited in claim 7 wherein said first half-wave rectifier circuit and said second half-wave rectifier circuit are in parallel.

9. A rectifier circuit as recited in claim 1 further comprising a diode coupled between said second three-phase winding and said first plurality of diodes.

10. A rectifier circuit as recited in claim 1 further comprising a second diode coupled between said first three-phase winding and said second diode rectifier.

11. An alternator comprising:
an alternator having a first three-phase winding and a second three-phase winding;
a rectifier circuit coupled to the first three-phase winding and the second three-phase winding;
said rectifier circuit having a first state and a second state, wherein in said first state said rectifier circuit forms a full-wave rectifier and when said switch circuit is in a second state said rectifier circuit forms two parallel half-wave rectifiers.

12. An alternator as recited in claim 11 wherein said rectifier circuit comprises a first diode rectifier and a second diode rectifier.

13. An alternator a s recited in claim 11 wherein said rectifier circuit comprises a first diode coupled between said second three-phase winding and said first diode rectifier.

14. An alternator as recited in claim 11 further comprising a second diode coupled between said first three-phase winding and said second diode rectifier.

15. An alternator as recited in claim 1 further comprising a speed sensor and controller, wherein said controller controls the switching of said rectifier circuit from said first state to said second state when the speed sensor indicates a speed above a predetermined speed.

16. A method of controlling an alternator having a first three-phase winding coupled to a first rectifier and a second three-phase winding coupled to a second rectifier, said method comprising the steps of:
generating a speed signal corresponding to a rotational speed of the alternator;
coupling the first rectifier and the second rectifier together to form a full-wave rectifier when the speed signal indicates a speed below a predetermined threshold; and
forming two parallel half-wave rectifiers when the speed signal indicates a speed above the predetermined threshold.

17. A method as recited in claim 16 wherein the step of coupling comprises controlling the operation of a switch circuit.

18. A method as recited in claim 16 wherein the step of forming comprises forming two parallel half-wave circuits that alternate operation to provide balanced operation of the alternator.

* * * * *